(12) United States Patent
Yoshida et al.

(10) Patent No.: US 7,721,101 B2
(45) Date of Patent: May 18, 2010

(54) COMMUNICATION APPARATUS AND AUTHENTICATION APPARATUS

(75) Inventors: Junji Yoshida, Neyagawa (JP); Shinji Hamai, Kadoma (JP)

(73) Assignee: Panasonic Corporation, Osaka (JP)

( * ) Notice: Subject to any disclaimer, the term of this patent is extended or adjusted under 35 U.S.C. 154(b) by 1229 days.

(21) Appl. No.: 10/511,903

(22) PCT Filed: Mar. 17, 2004

(86) PCT No.: PCT/JP2004/003586

§ 371 (c)(1),
(2), (4) Date: Oct. 20, 2004

(87) PCT Pub. No.: WO2004/091167

PCT Pub. Date: Oct. 21, 2004

(65) Prior Publication Data

US 2005/0257058 A1 Nov. 17, 2005

(30) Foreign Application Priority Data

Apr. 1, 2003 (JP) ............................... 2003-098596

(51) Int. Cl.
*H04L 9/32* (2006.01)
(52) U.S. Cl. ........................ 713/175; 713/156; 713/157; 713/158
(58) Field of Classification Search ................ 713/175
See application file for complete search history.

(56) References Cited

U.S. PATENT DOCUMENTS 5,657,390 A 8/1997 Elgamal et al.

(Continued)

FOREIGN PATENT DOCUMENTS

EP 1 262 859 12/2002

(Continued)

OTHER PUBLICATIONS

B. Crispo et al., "WWW Security and Trusted Third Party Services", Feb. 2000, Future Generations Computer Systems, Elsevier Science Publishers, Amsterdam, NL, pp. 331-341, XP004185845, ISSN: 0167-739X.

(Continued)

*Primary Examiner*—Emmanuel L Moise
*Assistant Examiner*—Luu Pham
(74) *Attorney, Agent, or Firm*—Wenderoth, Lind & Ponack, L.L.P.

(57) ABSTRACT

A communication apparatus with a memory (418) holding CA information A(301*a*) including (i) a CA certificate A(106*a*) indicating that an AP server certificate A(402*a*) (that indicates the validity of an application server (401)) is valid and (ii) a URL B(302*b*) indicating the URL of a download server B(406*b*) where CA information B(301*b*) including the next valid CA certificate B(106*b*) is stored. The communication apparatus also having a server authentication unit (416) verifying the AP server certificate A(402*a*) using the CA certificate A(106*a*), and having a CA information update unit (417) obtaining the CA information B(301*b*) from the download server B(406*b*) indicated by the URL B(302*b*), wherein, when the CA certificate A(106*a*) becomes revoked, the server authentication unit (416) authenticates the application server (401) using the CA certificate B(106*b*) included in the CA information B(301*b*) obtained by the CA information update unit (417).

2 Claims, 10 Drawing Sheets

U.S. PATENT DOCUMENTS

| | | |
|---|---|---|
| 6,006,034 A | 12/1999 | Heath et al. |
| 6,134,550 A * | 10/2000 | Van Oorschot et al. ......... 707/9 |
| 6,230,266 B1 * | 5/2001 | Perlman et al. ............. 713/158 |
| 6,511,811 B1 | 1/2003 | Olefsky et al. |
| 6,512,763 B1 | 1/2003 | DeGolia, Jr. |
| 2001/0011255 A1 * | 8/2001 | Asay et al. .................... 705/76 |
| 2002/0062438 A1 * | 5/2002 | Asay et al. ................. 713/157 |
| 2002/0108042 A1 * | 8/2002 | Oka et al. ................... 713/175 |
| 2002/0129241 A1 * | 9/2002 | Doyle et al. ................ 713/157 |

FOREIGN PATENT DOCUMENTS

| | | |
|---|---|---|
| JP | 2001-197054 | 7/2001 |
| JP | 2002-215826 * | 8/2002 |
| TW | 489285 | 6/2002 |
| WO | 01/01644 | 1/2001 |

OTHER PUBLICATIONS

R. Housley et al., "RFC—Request for Comments: 2459. Internet. X.509 Public Key Infrastructure Certificate and CRL Profile," Internet Engineering Task Force, IETF, Jan. 1, 1999, XP002247370.
Partial English Translation of JP 2002-215826, which was previously cited on PTO/SB/08 filed on Oct. 20, 2004.

* cited by examiner

COMMUNICATION APPARATUS AND AUTHENTICATION APPARATUS

BACKGROUND OF THE INVENTION

1. Field of the Invention

The present invention relates to a communication apparatus and the like as a client that receives a service from a server after checking the validity of such server, and particularly to a communication apparatus and the like for verifying a server certificate issued by a certificate authority.

2. Description of the Related Art

In recent years there has been rapid proliferation as well as an expanding use of the Internet, and there are a variety of services utilizing the Internet such as E-mail and Internet shopping. Behind this trend, however, there are problems of tapping and tampering of data such as individual information that is carried over the Internet. In order to prevent attacks from malicious third parties, a variety of security techniques have been conceived and employed. Such security techniques include cryptography for preventing data contents from being leaked, even when such data is tapped while being transmitted, and authentication for checking whether data has not been tampered in the course of transmission.

A technology known as SSL (Secure Sockets Layer) is a security technique that utilizes cryptography and authentication and that is often employed on the Internet. SSL, which is disclosed in U.S. Pat. No. 5,657,390, for example, is a technology for providing a communication that ensures that (1) a server is authenticated, (2) data is not leaked in the course of communication, and (3) the contents of data that the client is to receive has not been tampered in the course of communication.

Referring to FIGS. 1 and 2, a description is given of an overview of an SSL communication method.

FIG. 1 is a diagram illustrating how key information and certificates are prepared in SSL. This drawing shows a server 103 and a client 102 that carry out a secret communication, and a certificate authority 101 that issues a server certificate indicating the validity of the server 103.

A CA public key 104 is a public key corresponding to the private key of the certificate authority 101. A CA private key 105 is the private key of the certificate authority 101. A CA certificate 106 is a certificate indicating that a server certificate issued by the certificate authority 101 is valid. A server public key 107 is a public key corresponding to the private key of the server 103. A server private key 108 is the private key of the server 103. A server certificate 109 is a certificate indicating the validity of the server 103. And a signature 110 is a signature created by the certificate authority 101 on the server certificate 109.

FIG. 2 is a diagram showing an SSL communication protocol. In FIG. 2, a communication common key 201 is a common key to be used in a secret communication.

The certificate authority 101 previously generates a key pair consisting of the CA public key 104 and the CA private key 105, and generates, at the same time, a CA certificate 106 that describes the CA public key 104 and information concerning the certificate authority 101.

Before starting the operation, the server 103 first generates a key pair consisting of the server public key 107 and the server private key 108. Then, the server 103 sends, to the certificate authority 101, the server public key 107 and information concerning the server 103, so as to request for the issue of a server certificate 109.

Using the CA private key 105, the certificate authority 101 creates a signature 110 from information received from the server 103 and other necessary information, and issues, for the server 103, a server certificate 109 that is the result of putting together the information from the server 103, the other necessary information, and the signature 110.

The server 103 stores the received server certificate 109.

Meanwhile, the client 102 previously obtains the CA certificate 106 from the certificate authority 101, and stores it.

The following describes how the client 102 and the server 103 actually carry out a secret communication.

When getting connected to the server 103, the client 102 negotiates with the server 103 which encryption specification to use in the secret communication.

Next, the server 103 sends the server certificate 109 to the client 102.

Then, the client 102 verifies if the server certificate 109 is valid or not using the CA public key 104 which the client 102 stores in itself. When the server certificate 109 is valid, i.e., the signature 110 included in such server certificate 109 is one created by use of the CA private key 105, it is possible for the client 102 to verify the validity of the server certificate 109 using the CA public key 104.

After verifying that the server certificate 109 is valid, the client 102 randomly generates information about common key generation on the client side (hereinafter referred to as "client-side common key generation information), and sends the generated information to the server 103.

Meanwhile, the server 103 randomly generates information about common key generation on the server side (hereinafter referred to as "server-side common key generation information), and sends the generated information to the client 102.

Then, the server 103 and the client 102 generate a communication common key 201 using the above server-side common key generation information and client-side common key generation information.

Through the above operation, it becomes possible for the client 102 and the server 103 to share the communication common key 201.

From then on, by using the communication common key 201 to encrypt and decrypt data to be transmitted, it becomes possible for the client 102 and the server 103 to carry out a secret communication.

Note that the X.509 certificate format defied by the ITU-T (International Telecommunication Union-Telecommunication Standardization Sector) is often employed as the format of a CA certificate 106 and a server certificate 109.

According to the X.509 certificate format, a server certificate 109 needs to describe the validity period. This is because the security of a private key depends on the fact that it takes sufficiently long time to calculate the private key from the public key and communication data, meaning that there is a higher possibility that the private key will be exposed if the same key continues to be used for a longer period of time.

Similarly, a CA certificate 106 is also required to describe the validity period, which is longer than that of a server certificate 109 in general.

Meanwhile, when the validity period of a CA certificate expires, or when the CA private key is exposed due to some cause, it is necessary to immediately generate a new key pair and to issue/obtain a new CA certificate.

For example, in the case where (1) there are a sufficient number of certificate authorities which are available at the same time, (2) a client has a sufficient computer resource such as a PC (Personal Computer), and (3) such client can therefore posses all or a required number of CA certificates of the certificate authorities, it is possible for a server to use a server certificate that was issued by another certificate authority other than a revoked certificate authority. In this case, the client verifies such server certificate by using, one after another, the CA certificates which it possesses. When the client can verify the validity of the server certificate by using any one of such CA certificates, it is possible for the client to verify that such server is an authenticated server.

Meanwhile, when a certificate authority is newly established, the user of a client apparatus can obtain a CA certificate of such certificate authority from the certificate authority itself or from a reliable server, and then installs the obtained CA certificate in its client apparatus.

Also, there are apparatuses and methods for automatically renewing a server certificate when the validity period of the server certificate is close to expiring and when the server certificate gets revoked. Such techniques are disclosed, for example, in Japanese Laid-Open Patent publication No. 2001-197054 and Japanese Laid-Open Patent publication No. 2002-215826.

With the above existing techniques, however, if a client apparatus is a home appliance, for example, that is not equipped with a sufficient amount of resources including a memory, there is a problem that it is difficult for such client apparatus to possess many CA certificates at the same time and to be equipped with a program or a circuit for authenticating a server by use of plural CA certificates.

Furthermore, if a client apparatus does not have a clock (calendar/timer) or any means for setting the clock to the correct time, it is difficult for such client apparatus to check the validity period of a CA certificate, which causes the problem that such client apparatus cannot renew the CA certificate automatically even when the end of the validity period is approaching.

The present invention has been conceived in view of the above problems, and it is an object of the present invention to provide a communication apparatus, an authentication apparatus, and the like which make it possible to verify the validity of a server, with a CA certificate being renewed in a safe and secure manner, even when the communication apparatus is equipped only with a small amount of resources.

BRIEF SUMMARY OF THE INVENTION

In order to achieve the above object, the communication apparatus according to the present invention is a communication apparatus for verifying validity of a server that is connected to said communication apparatus via a communication network, comprising: a first storage unit operable to hold first CA information that includes a first CA certificate and a next address for update, the first CA certificate indicating that a server certificate that indicates the validity of the server is valid, and the next address for update indicating a location, on the communication network, of a download server on which second CA information is placed, said second CA information including a second CA certificate to be a next valid CA certificate in a case where said first CA certificate becomes revoked; an authentication unit operable to authenticate the server by verifying the server certificate using the first CA certificate; and a CA information update unit operable to obtain the second CA information from the download server indicated by the next address for update, wherein when the first CA certificate becomes revoked, the authentication unit thereafter authenticates the server using the second CA certificate included in the second CA information obtained by the CA information update unit. Accordingly, since it becomes possible to obtain the second CA certificate which is the next valid CA certificate by making an access to the download server indicated by the next address for update included in the first CA information, it is no longer necessary for the communication apparatus to pre-store a plurality of CA certificates. Thus, even if the communication apparatus is a home appliance and the like with a small amount of resources such as memory, it becomes possible for the communication apparatus to verify the validity of the server, with the CA certificate being renewed.

Here, the CA information update unit may try to connect to the download server periodically, and obtain the second CA information from the download server when said connection succeeds. Accordingly, since it becomes possible for the communication apparatus to obtain the second CA certificate which is the next valid CA certificate by setting up the download server before a certain period of times before the end of the validity period of the first CA certificate, it is no longer necessary to manage the validity period using a calendar, a timer, or the like, meaning that such communication apparatus is required to be equipped with only a small amount of resources.

Moreover, the CA information update unit may try to connect to the download server when the authentication unit has failed to authenticate the server using the first CA certificate, and obtain the second CA information from the download server when said connection succeeds. Accordingly, even in the case where the first CA certificate gets revoked before its validity period, it becomes possible for the communication apparatus to obtain, from the download server, the second CA certificate which is the next valid CA certificate, immediately after such revocation.

Moreover, the authentication unit may try to authenticate the server using the second CA certificate included in the second CA information obtained by the CA information update unit, and when said authentication succeeds, thereafter authenticate the server using the second CA certificate instead of the first CA certificate. Accordingly, it becomes possible to switch the CA certificate from the first CA certificate to the second CA certificate as soon as such second CA certificate becomes valid, as a result of which the communication apparatus is not required to manage the validity periods of the first and second CA certificates.

Furthermore, the communication apparatus with the above configuration may further comprise a second storage unit operable to hold the second CA information, and in said communication apparatus, the CA information update unit may store, into the second storage unit, the second CA information obtained from the download server, and when the first CA certificate becomes revoked, the authentication unit may thereafter authenticate the server using the second CA certificate included in the second CA information stored in the second storage unit. Furthermore, when the first CA certificate becomes revoked, the authentication unit may move the second CA information stored in the second storage unit into the first storage unit, and thereafter authenticate the server using the second CA certificate included in the second CA information stored in the first storage unit. By repeating the processing of holding CA certificates equivalent to only two generations, i.e., the currently valid CA certificate (first CA certificate) and the next valid CA certificate (second CA certificate) according to the above usage of memories, with the current CA certificate being renewed when necessary, it becomes no longer necessary for the communication apparatus to unnecessarily hold a larger number of CA certificates.

Moreover, the CA information update unit may obtain, from the download server, a download server certificate indicating validity of said download server, and obtain the second CA information after authenticating the validity of the download server based on said obtained download server certificate. Accordingly, since the communication apparatus obtains the second CA information after verifying the validity of the download server itself, it becomes possible to obtain the authentic second CA information in a secure manner.

Note that not only is it possible to embody the present invention as a communication apparatus (client apparatus) with the above configuration, but also as (i) a method for verifying the validity of a server that includes, as its steps, the processes performed by the communication apparatus, (ii) an authentication apparatus (certificate authority) for issuing server certificates and CA information to the communication apparatus, (iii) an authentication method that includes, as its steps, the processes performed by such authentication apparatus, (iv) a program that causes a computer to execute the steps included in the above methods, (v) a recording medium on which such program is stored, and (vi) a method for operating an authentication system that includes, as its steps, the procedure for operating the authentication apparatus and download server.

As described above, the present invention makes it possible for an apparatus with a small amount of resources to obtain and renew a CA certificate in a reliable manner, without needing to care about when the validity period of a CA certificate expires. Therefore, the present invention is extremely useful especially in an authentication system which includes, as a client apparatus, a home appliance and the like.

As further information about the technical background to this application, Japanese Laid-Open Patent application No. 2003-098596 filed on Apr. 1, 2003, is incorporated herein by reference.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings.

DETAILED DESCRIPTION OF THE INVENTION

The following describes the embodiments of the present invention with reference to the drawings.

First Embodiment

Figure 1:
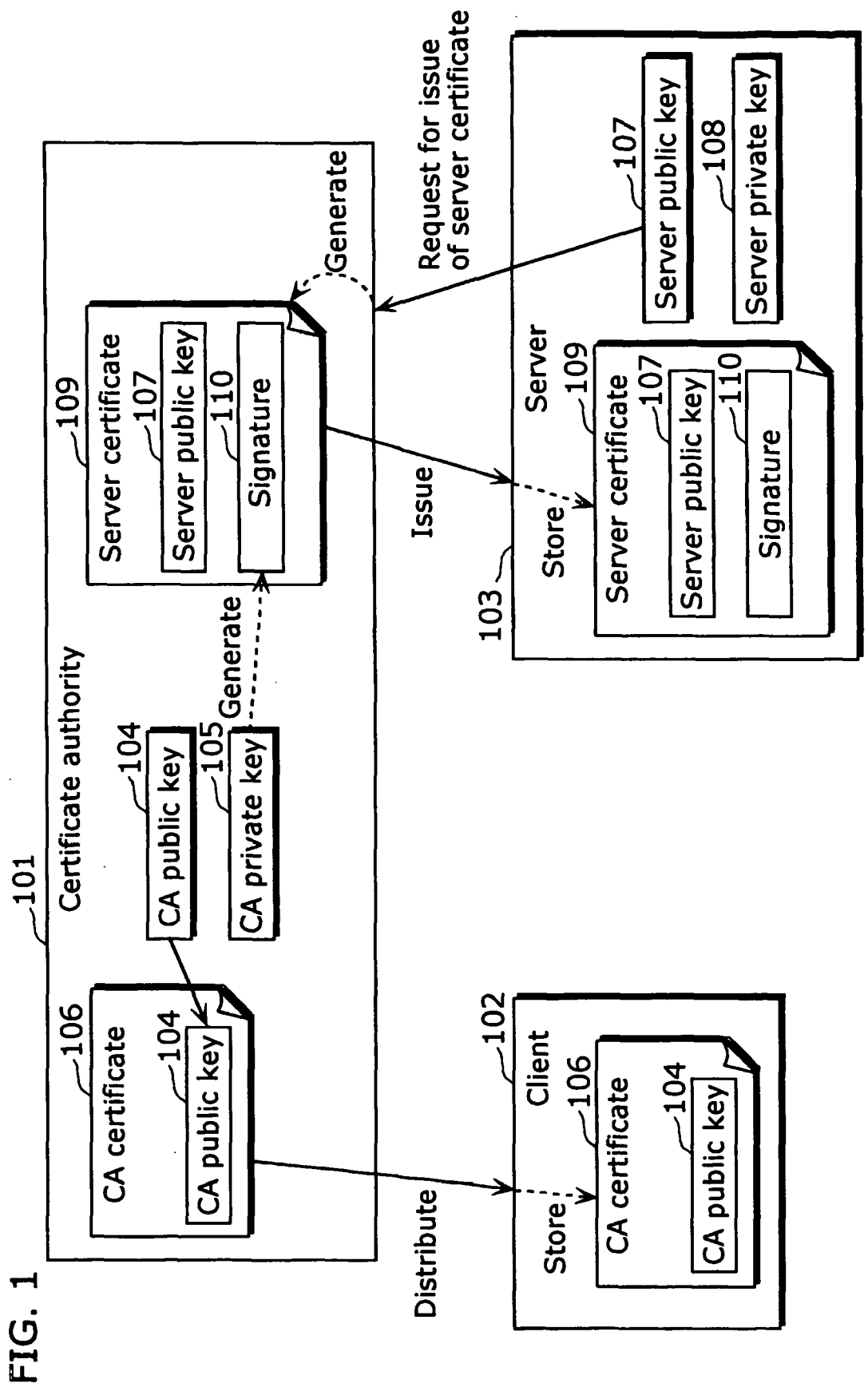
FIG. 1 is a diagram illustrating how key information and certificates are prepared in SSL that is an existing secret communication.
Figure 2:
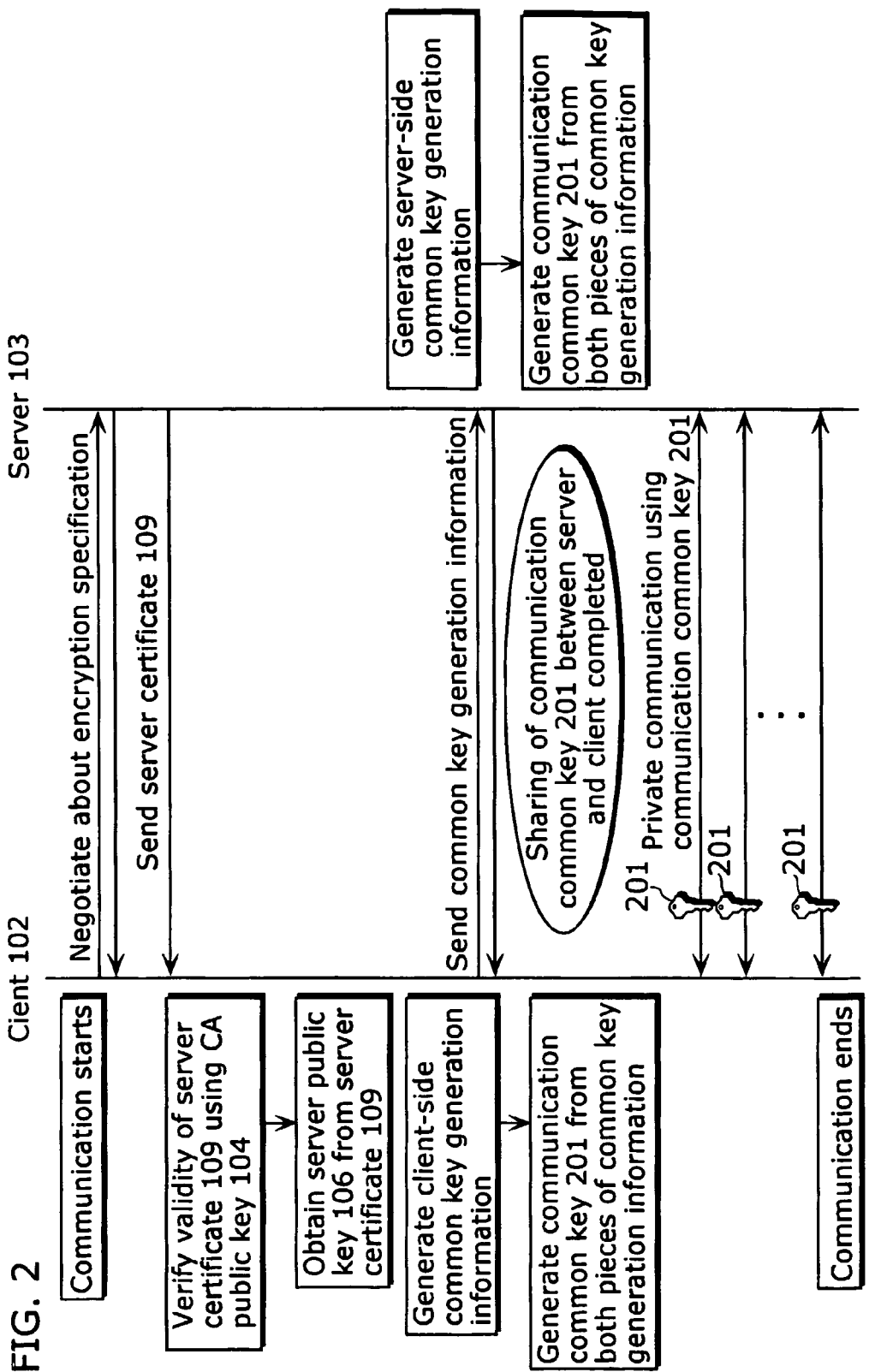
FIG. 2 is a diagram showing an SSL communication protocol.
Figure 3:
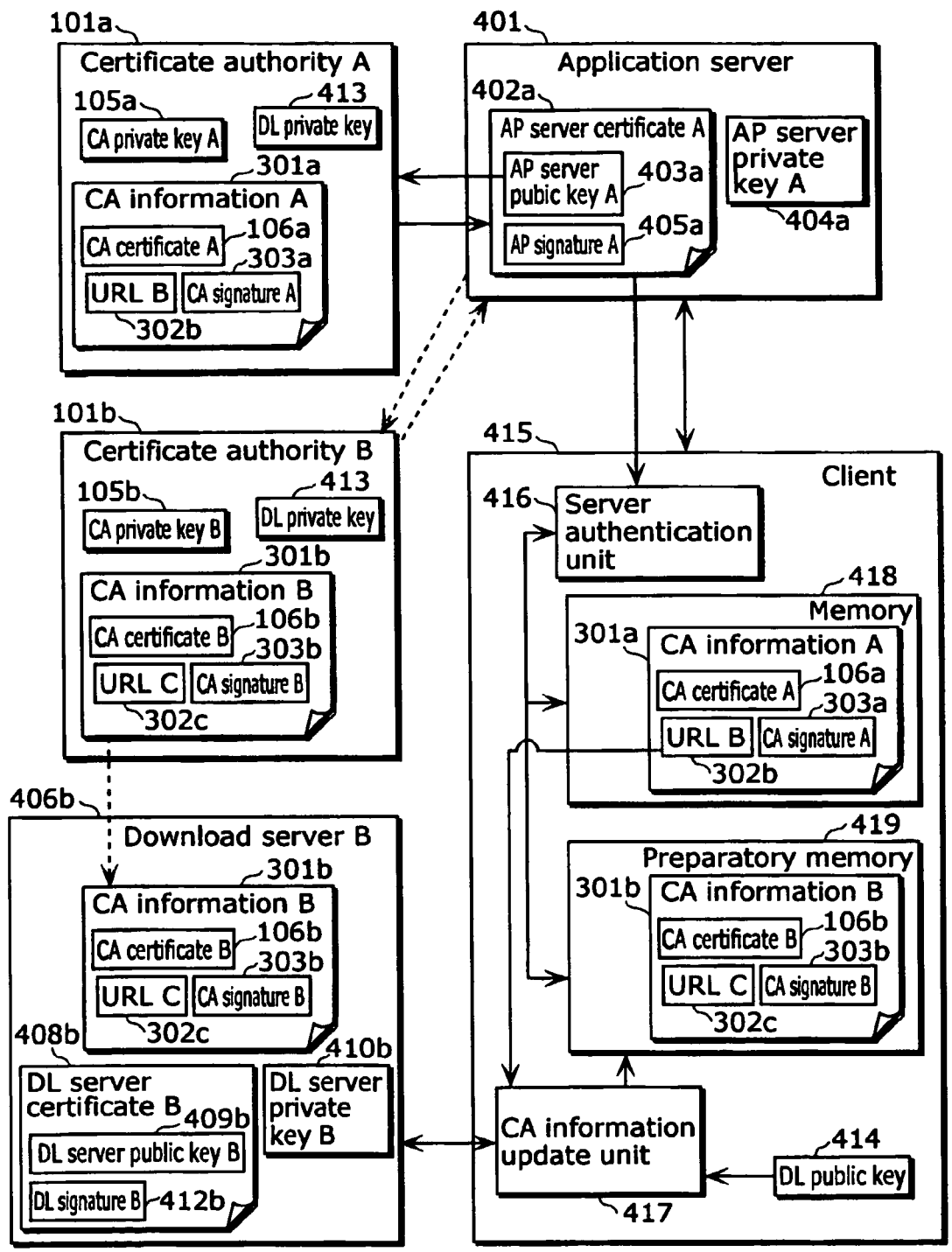
FIG. 3 is a diagram showing a configuration of a communication system according to a first embodiment.
Figure 4:
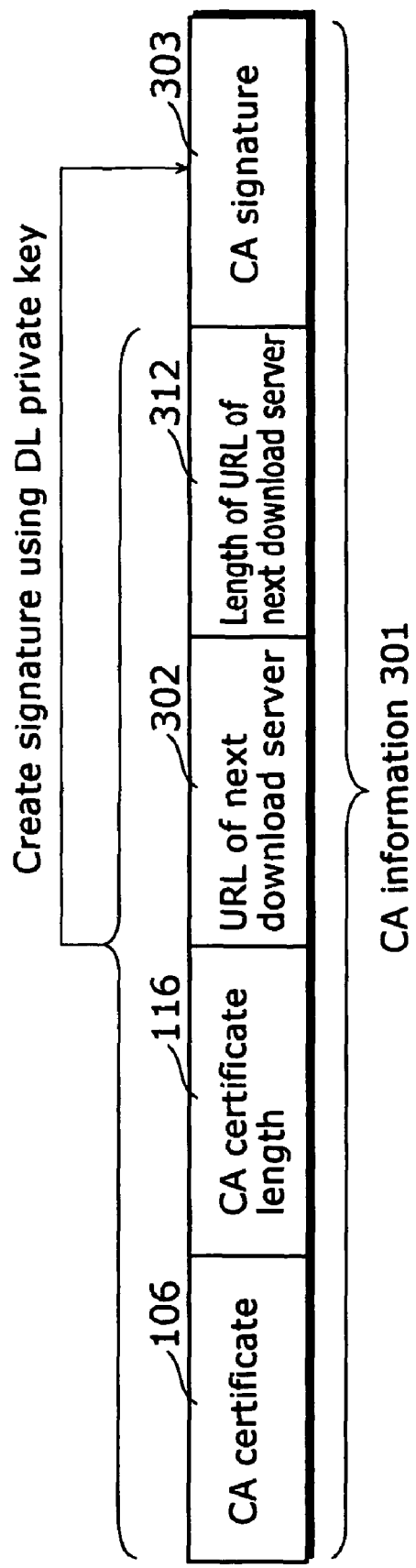
FIG. 4 is a diagram showing an example of CA information.

Referring to FIGS. 3 and 4, a description is first given of the first embodiment of the present invention.

FIG. 3 is a diagram showing the configuration of a communication system according to the present embodiment. This communication system is formed of a certificate authority A 101a, a certificate authority B 101b, an application server 401, a client 415, and a download server B 406b, which are connected over a communication network such as the Internet. Here, the application server 401 shall first be authenticated by the certificate authority A 101a and then by the certificate authority B 101b, due to the approaching of the validity period and the like.

The application server 401, which is a computer apparatus and the like for providing a service in a specific application system (e.g., providing the latest firmware to a DVD player of a specific manufacturer), possesses an AP server private key A 404a and an AP server certificate A 402a. The AP server private key A 404a is the private key of this application server 401. The AP server certificate A 402a, which is a certificate indicating the validity of the application server 401 issued by the certificate authority A 101a, includes an AP server public key A 403a that is the public key corresponding to the AP server private key A 404a and an AP signature A 405a that is a signature created by the certificate authority A 101a on such AP server certificate A 402a.

The client 415, which is a home appliance and the like that receives a service (e.g., downloads firmware) from the application server 401 after verifying the validity of such application server 401, is comprised of a server authentication unit 416, a memory 418, a preparatory memory 419, a CA information update unit 417, and a DL public key 414. The server authentication unit 416 is a processing unit for authenticating the application server 401 by verifying the AP server certificate A 402a received from such application server 401. The memory 418 is a memory for holding, in the default state, CA information A 301a that is certificate authority A 101a-related information and that is used for verifying the AP server certificate A 402a. The preparatory memory 419 is a memory for holding CA information B 301b that is certificate authority B 101b-related information used to carry on with the verification processing on the application server 401 (stated another way, to verify the AP server certificate B indicating the validity of the application server 401 issued by the certificate authority B 101b), in the case where the CA information A 301a stored in the memory 418 gets revoked, for example. The CA information update unit 417 is a processing unit for obtaining the next valid CA information (CA information B 301b) from the download server B 406b and stores it into the preparatory memory 419, when the CA information A 301a stored in the memory 418 gets revoked, for example. The DL public key 414 is the public key corresponding to a DL server private key B 410b of the download server B 406b.

The certificate authority A 101a, which is a certificate authority that issues the AP server certificate A 402a indicating the validity of the application server 401 and the CA information A 301a used to verify the validity of such AP server certificate A 402a, possesses a CA private key A 105a, a DL private key 413, and the CA information A 301a. The CA private key A 105a is the private key of this certificate authority A 101a, whereas the DL private key 413 is the private key of the download server B 406*b*. The CA information A 301*a* includes (1) the CA certificate A 106*a* indicating the validity of a server certificate issued by the certificate authority A 101*a* (here, the AP server certificate A 402*a* and the DL server certificate B 408*b*), (2) a URL B 302*b* which is the URL of the download server B 406*b* where the CA information B 301*b*, which is the next valid CA information after this CA information A 301*a*, will be stored, and (3) a CA signature A 303*a* which is a signature created on this CA information A 301*a* by use of the DL private key 413.

The certificate authority B 101*b*, which is a certificate authority that issues the CA information B 301*b* to be the next valid CA information after the CA information A 301*a* issued by the certificate authority A 101*a*, possesses a CA private key B 105*b*, the DL private key 413, and the CA information B 301*b*. The CA private key B 105*b* is the private key of this certificate authority B 101*b*. The CA information B 301*b* includes (1) the CA certificate B 106*b* indicating the validity of a server certificate issued by the certificate authority B 101*b* (here, the AP server certificate B 402*b* and the like), (2) a URL C 302*c* which is the URL of the download server C where CA information C, which is the next valid CA information after this CA information B 301*b*, will be stored, and (3) a CA signature B 303*b* which is a signature created on this CA information B 301*b* by use of the DL private key 413.

The download server B 406*b*, which is a server apparatus from which the client 415 downloads the next valid CA information, possesses the CA information B 301*b*, the DL server certificate B 408*b* and the DL server private key B 410*b*. The CA information B 301*b* is the next valid CA information after the CA information A 301*a* (the CA information B 301*b* is sent from the certificate authority B 101*b*). The DL server private key B 410*b* is the private key of this download server B 406*b*. The DL server certificate B 408*b*, which is a server certificate issued by the certificate authority B 101*b*, indicates the validity of the download server B 406*b*. Such DL server certificate B 408*b* includes a DL server public key B 409*b* which is the public key corresponding to the DL server private key B 410*b*, and a DL signature B 412*b* which is created by the certificate authority B 101*b* on this DL server certificate B 408*b*.

FIG. 4 is a diagram showing a more detailed data structure of the CA information A 301*a* and CA information B 301*b* illustrated in FIG. 3. The CA information 301 includes: a CA certificate 106 indicating that a server certificate is valid; a CA certificate length 116 which is information indicating the length of such CA certificate 106; a URL 302 of a download server on which the next valid CA information after the CA information 301 will be stored; URL length information 312 indicating the length of the URL 302; and a CA signature 303 for the above four pieces of information (here, a signature created by the DL private key 413). Note that the CA certificate 106 includes the public key of the certificate authority (CA public key) to be used for verifying the validity of a server certificate issued by the certificate authority.

The use of the CA information 301 with the above structure makes it possible for the client 415 to verify the validity of the application server 401. In other words, by using the CA certificate 106 included in the obtained CA information 301 after verifying the validity of the CA information 301 itself though the verification of the CA signature 303 on such CA information 301 by use of the DL public key 414, the client 415 can verify the validity of the server certificate received from the application server 401, and by making an access to the URL 302 included in such CA information 301, the client 415 can obtain CA information which will be valid after the CA information 301.

The following describes a server authentication operation (processing for verifying the validity of the application server 401) to be carried out by the client 415.

First, the application server 401 generates an AP server private key A 404*a* and an AP server public key A 403*a* that make up a key pair for an SSL communication. Then, the application server 401 sends, to the certificate authority A 101*a*, the AP server public key A 403*a* and other necessary information, so as to request for the issue of a server certificate.

The certificate authority A 101*a* pre-stores a key pair consisting of the CA private key A 105*a* and the CA public key A. Upon receipt of the request from the application server 401 for the issue of a server certificate, the certificate authority A 101*a* issues an AP server certificate A 402*a* that includes a signature which it has created with the CA private key A 105*b*, and sends such server certificate A 402*a* to the application server 401.

Furthermore, after generating a CA certificate A 106*a* which is a server certificate including the CA public key A, the certificate authority A 101*a* generates CA information A 301*a* that includes such CA certificate A 106*a*. A URL B 302*b* to be added to such CA information A 301*a* is the URL of the download server B 406*b*.

The client 415 stores in its internal memory 418 the CA information A 301*a* in the default state, with nothing being stored in its preparatory memory 419.

When the client 415 is to carry out an SSL communication with the application server 401, the server authentication unit 416 obtains the AP server certificate A 402*a* from the application server 401, and performs verification on the obtained AP server certificate A 402*a* using the CA public key A contained in the CA certificate A 106*a* stored in the memory 418.

If such AP server certificate A 402*a* is verified as valid, it becomes possible for the client 415 and the application server 401 to carry out an SSL communication, as in the case of the existing techniques.

Next, a description is given of the operation performed by the client 415 when updating CA information.

When the validity period of the CA certificate A 106*a* is close to expiring, it becomes necessary for the client 415 to be able to obtain a new CA certificate before the expiration date. In order to enable the client 415 to do so, the system operator, before the validity period expires, first sets up a new certificate authority B 101*b* possessing a key pair consisting of the CA private key B 105*b* and the CA public key B, and such new certificate authority B 101*b* generates a new CA certificate B 106*b* that includes the CA public key B. At this point of time, however, the certificate authority B 101*b* does not issue any AP server certificates to the application server 401. Even if the certificate authority B 101*b* did issue an AP server certificate, the application server 401 will not use the AP server certificate obtained from the certificate authority B 101*b* for server authentication to be performed in a communication with the client 415.

The certificate authority B 101*b* generates new CA information B 301*b* from the CA certificate B 106*b* it has generated. The URL C 302*c*, to be described in the CA information B 301*b*, shall be the URL of the download server C from which new CA information will be downloaded next time, and the CA signature B 303*b* to be described in the CA information B 301*b* shall be created in an equivalent manner in which the CA signature A 303*a* was created.

Next, the system operator sets up a download server B 406*b* at the location (a website on the network, and the like) specified by the URL B 302*b*, so that the CA information B 301*b* can be downloaded from it. When this is done, the download server B 406b generates a key pair consisting of the DL server public key B 409b and the DL server private key B 410b, and sends the DL server public key B 409b and necessary information to the certificate authority A 101a, so as to obtain a DL server certificate B 408b from the certificate authority A 101a, as a server certificate.

Meanwhile, the CA information update unit 417 of the client 415 tries to connect to the download server specified by the URL B 302b that is described in the CA information A 301a stored in the memory 418 at certain time intervals, e.g., once every month.

When the download server B 406b is not in operation, the CA information update unit 417 fails to connect to the download server B 406b, in which case it judges that there is no need for updating the current CA information. From then on, the CA information update unit 417 tries to connect to the download server B 406b once every month, for example, as above.

When the download server B 406b is in operation, on the other hand, the CA information update unit 417 succeeds in getting connected to the download server B 406b, in which case it first obtains the DL server certificate B 408b and then performs verification on it using the CA public key A (which is included in the CA certificate A 106a) stored in the memory 418.

After verifying the validity of the DL server certificate B 408b, the CA information update unit 417 then obtains the CA information B 301b from the download server B 406b. The CA information update unit 417 performs verification on the CA signature B 303b included in the obtained CA information B 301b, by using the DL public key 414, and stores such CA signature B 303b into the preparatory memory 419 when the validity of the CA information B 301b has been verified.

Next, a description is given of the operation performed by the application server 401 and the client 415 when the validity period of the CA certificate A 106a expires.

The application server 401 generates a new key pair consisting of the AP server public key and the AP server private key before the validity period of the CA certificate A 106a expires or upon termination of such validity period, and obtains a new AP server certificate B from the certificate authority B 101b. When the validity period of the CA certificate A 106a expires, the application server 401 destroys the old AP server certificate A 402a, and sends the AP server certificate B as a server certificate, when needing to carry out an SSL communication from then on.

As described above, when the validity period of the CA certificate A 106a expires, the server authentication unit 416 of the client 415 receives a new AP server certificate B in order to communicate with the application server 401. However, verification on the AP server certificate B fails if the CA public key A included in the CA certificate A 106a stored in the memory 418 is used. In such case, the server authentication unit 416 performs verification on the AP server certificate B by use of the CA public key B included in the CA information B 301b stored in the preparatory memory 419. When the validity of the AP server certificate B has been verified, the client 415 continues to carry out the SSL communication with the application server 401.

When this is done, the server authentication unit 416 moves the CA information B 301b stored in the preparatory memory 419 into the memory 418, and subsequently empties the preparatory memory 419. From then on, the server authentication unit 416 uses the CA information B 301b stored in the memory 418 to perform authentication in a communication with the application server 401.

When nothing is stored in the preparatory memory 419, on the other hand, the server authentication unit 416 indicates the CA information update unit 417 to obtain new CA information. Upon receipt of such indication, the CA information update unit 417 obtains new CA information B 301b from the download server B 406b in the same manner as described above. After obtaining the new CA information B 301b, the server authentication unit 416 performs authentication on the application server 401 by use of such CA information B 301b.

From then on, the client 415 can automatically obtain a new CA certificate by carrying out the operation in the similar manner as above when the validity period of a CA certificate is close to expiring, and can automatically perform authentication by use of a new CA certificate when the validity period of a CA certificate expires.

As described above, according to the present embodiment, the certificate authority A 101a previously sends, to the client 415, the URL of the download server B 406b that is a website from which a CA certificate will be downloaded next time, together with a new CA certificate. When the validity period of the CA certificate is close to expiring, the system operator sets up the certificate authority B 101b that will issue a new CA certificate, and brings the download server B 406b into operation at the same time. Meanwhile, the client 415 periodically tries to make an access to the URL of the download server B 406b, downloads a new CA certificate from it and stores such new CA certificate into the preparatory memory 419, when succeeding in making an access to the download server B 406b. Then, when becoming unable to verify the validity of the server certificate of the application server 401 in a communication by use of the current CA certificate, the client 415 uses the new CA certificate stored in the preparatory memory 419 to perform authentication on the application server 401. When the validity of the application server 401 has been verified, the client 415 deletes the original CA certificate, so as to use the new CA certificate to verify a server certificate from then on.

Accordingly, since it becomes possible for the client 415 to renew the CA certificate simply by holding the next valid CA certificate, there is no need for the client 415 to hold many CA certificates all the time or to be equipped with a program or a circuit for authenticating a server by use of plural CA certificates. What is more, since it is possible for the client 415 to start communicating with another application server after obtaining a new CA certificate by periodically accessing the download server B 406b, there is no need for such client 415 to check the validity period of the current CA certificate by use of a clock. Thus, even if the client 415 is a home appliance and the like which is not equipped with a sufficient amount of recourses, it becomes possible for the client 415 to obtain and renew a CA certificate in a reliable manner, without needing to care about when the validity period of a CA certificate expires.

Note that, in the present embodiment, the CA information update unit 417 tries to connect to the download server specified by the URL that is described in the CA information stored in the memory 418 once every month, but the present invention is not limited to a one month interval and therefore a longer or shorter interval is also applicable. Moreover, such an interval may be uniform or there may be variations in intervals to some extent. To put it briefly, any interval may be applicable to the present invention as long as an attempt can be made at least once without fail from when a download server starts operating to when the validity period of the current CA certificate expires.

Moreover, in the present embodiment, the application server 401 generates a new key pair consisting of the AP server public key and the AP server private key upon expiration of the validity period of a CA certificate, but the application server 401 may generate a new key pair consisting of the AP server public key and the AP server private key even before the validity period of a CA certificate expires, so as to obtain a new AP server certificate. Since the new AP server certificate includes an AP signature created by the same CA private key in such case too, it is possible for the client 415 to verify the new AP server certificate using the CA public key which it stores.

Furthermore, the CA information 301 shown in FIG. 4 may include other information not illustrated in the drawing.

Also, the CA information update unit 417 stores downloaded new CA information into the preparatory memory 419 when the validity of such new CA information has been verified, but the CA information update unit 417 does not have to store the CA signature 303 at this time. This makes it possible to reduce the memory amount of the preparatory memory 419. Similarly, the CA information A 301a is stored in the memory 418 in the default state, but the CA signature A 303a does not have to be stored there.

Furthermore, in the present embodiment, the server authentication unit 416 empties the preparatory memory 419 after moving the CA information B 301b stored in the preparatory memory 419 into the memory 418. Instead of this, however, the server authentication unit 416 may switch the roles of the memory 418 and the preparatory memory 419 after emptying the memory 418, and from then on, switch the roles of the memory 418 and the preparatory memory 419 every time CA information is updated.

Second Embodiment

Next, referring to FIGS. 5-9, a description is given of example operations of the certificate authorities and download server according to the first embodiment, as the second embodiment of the present invention.

Figure 5:
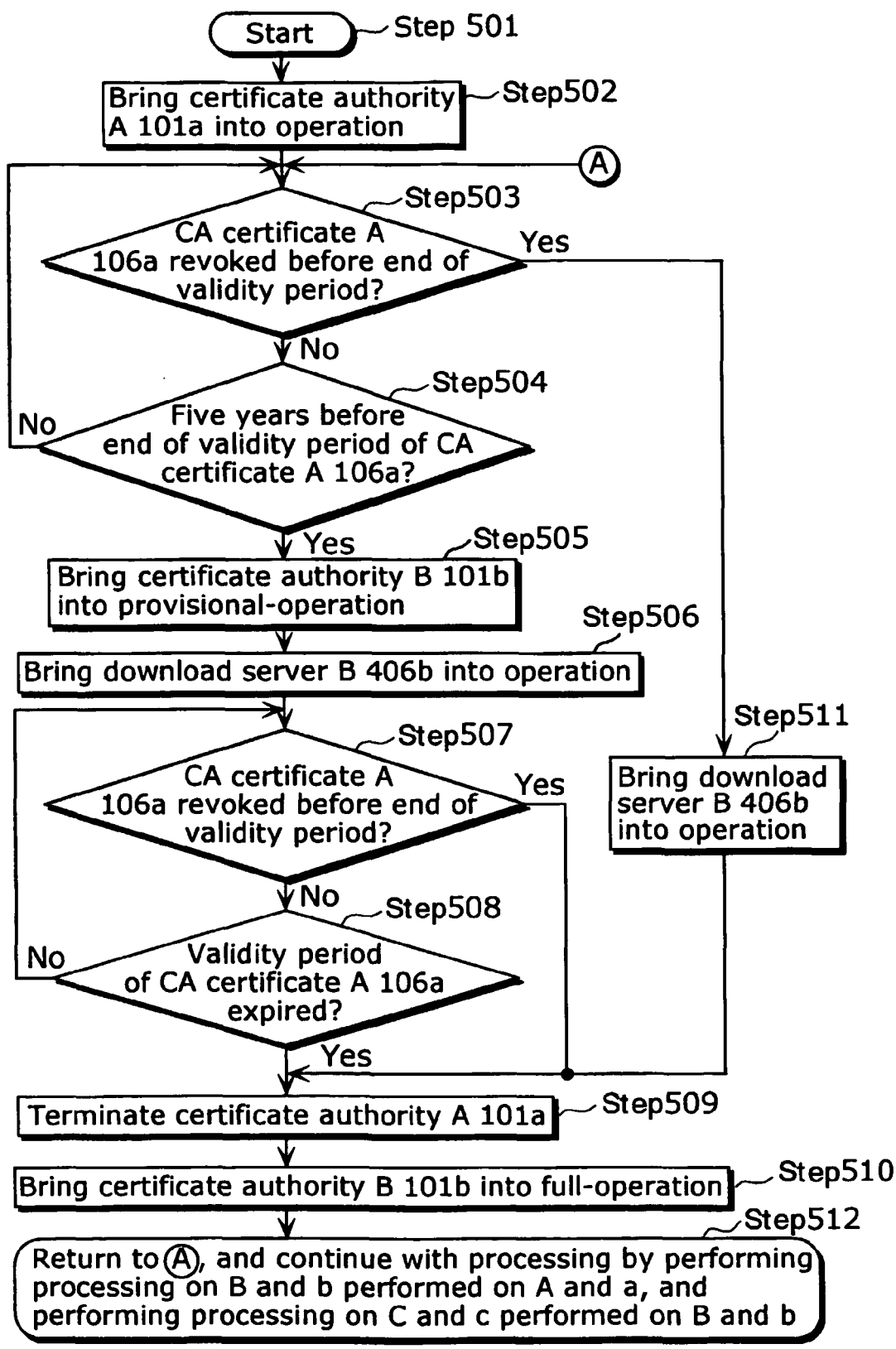
FIG. 5 is a flowchart showing an example operation of certificate authorities and download server according to a second embodiment.

FIG. 5 is a flowchart showing an example operation of the certificate authorities and download server.

Figure 6:
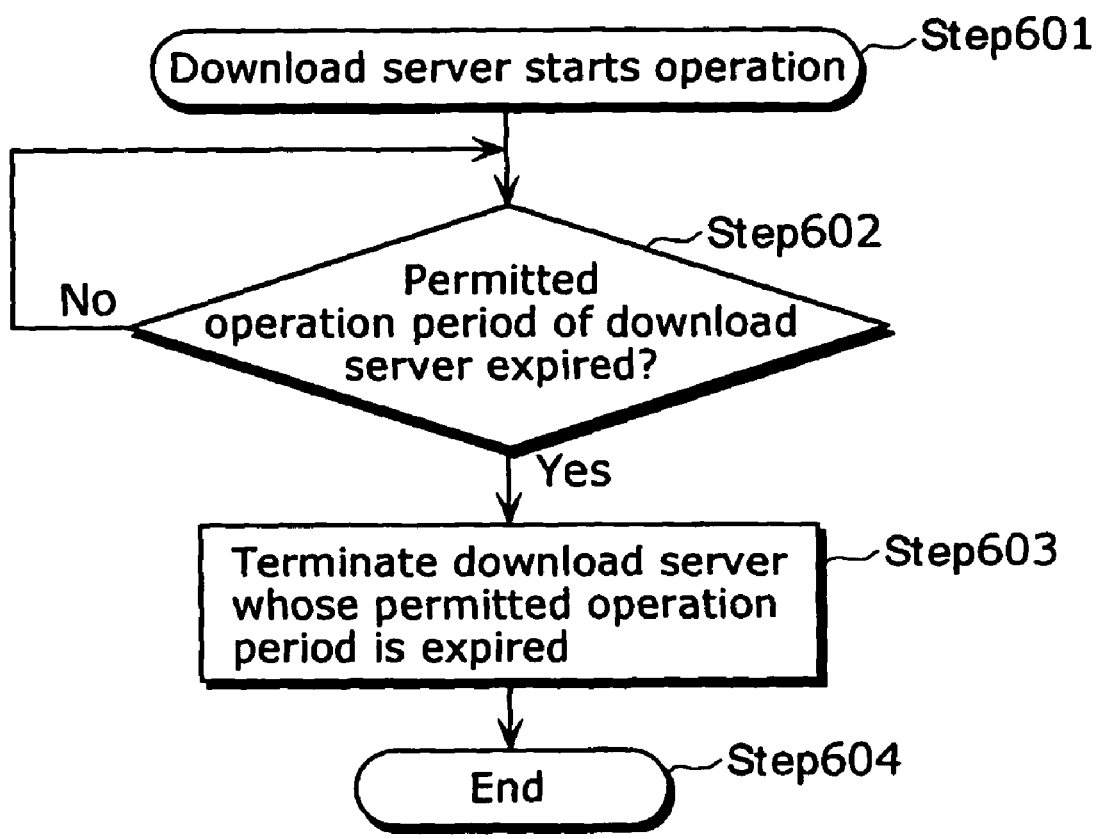
FIG. 6 is a flowchart showing how termination of the download server is determined.

FIG. 6 is a flowchart showing how the termination of the download server is determined.

Figure 7:
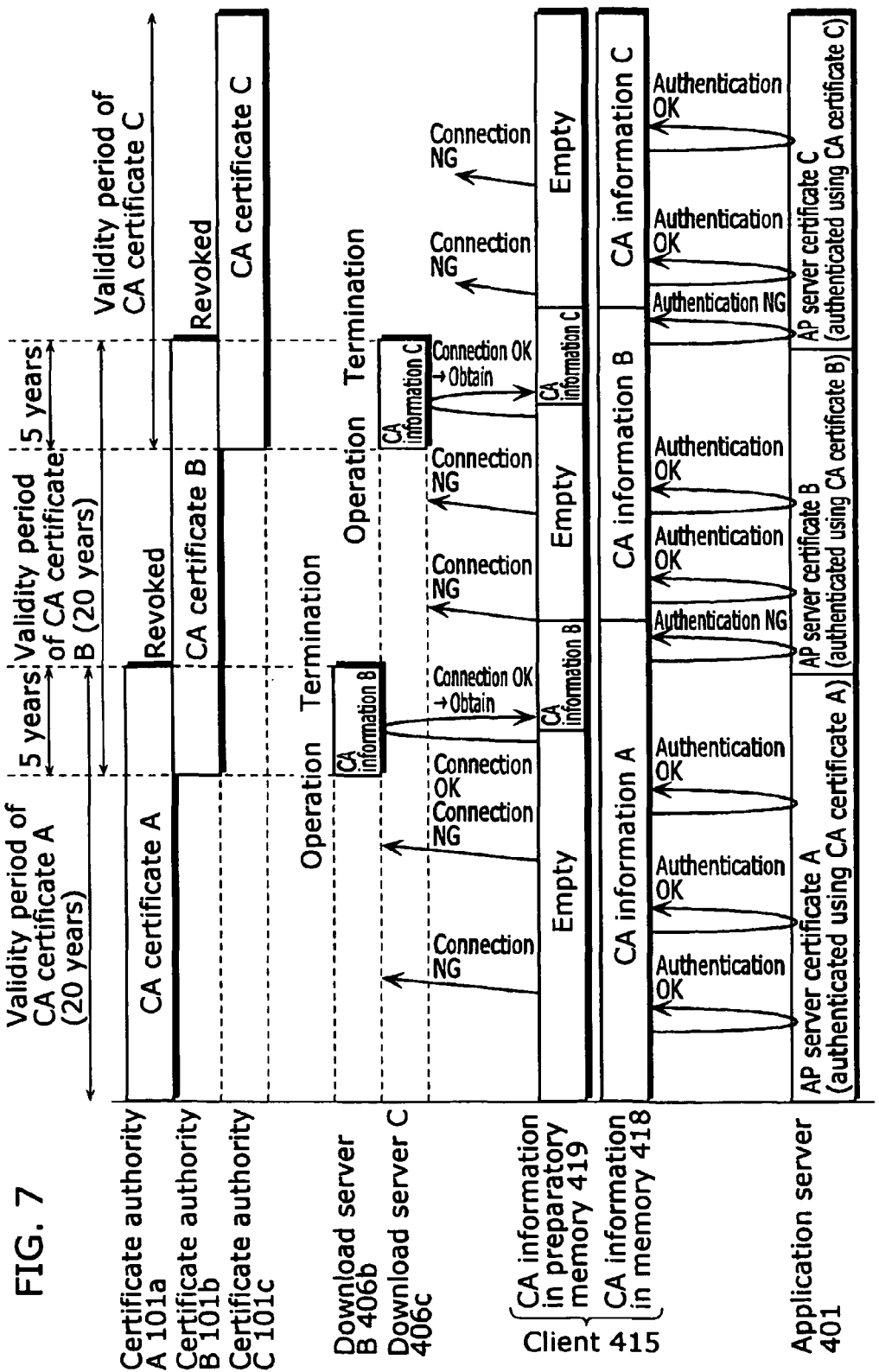
FIG. 7 is a diagram showing an example operational flow of the certificate authorities, client, download servers, and application server (at the normal case)

FIG. 7 is a diagram showing an example operational flow of the certificate authorities, client, download servers, and application server at the normal case.

Figure 8:
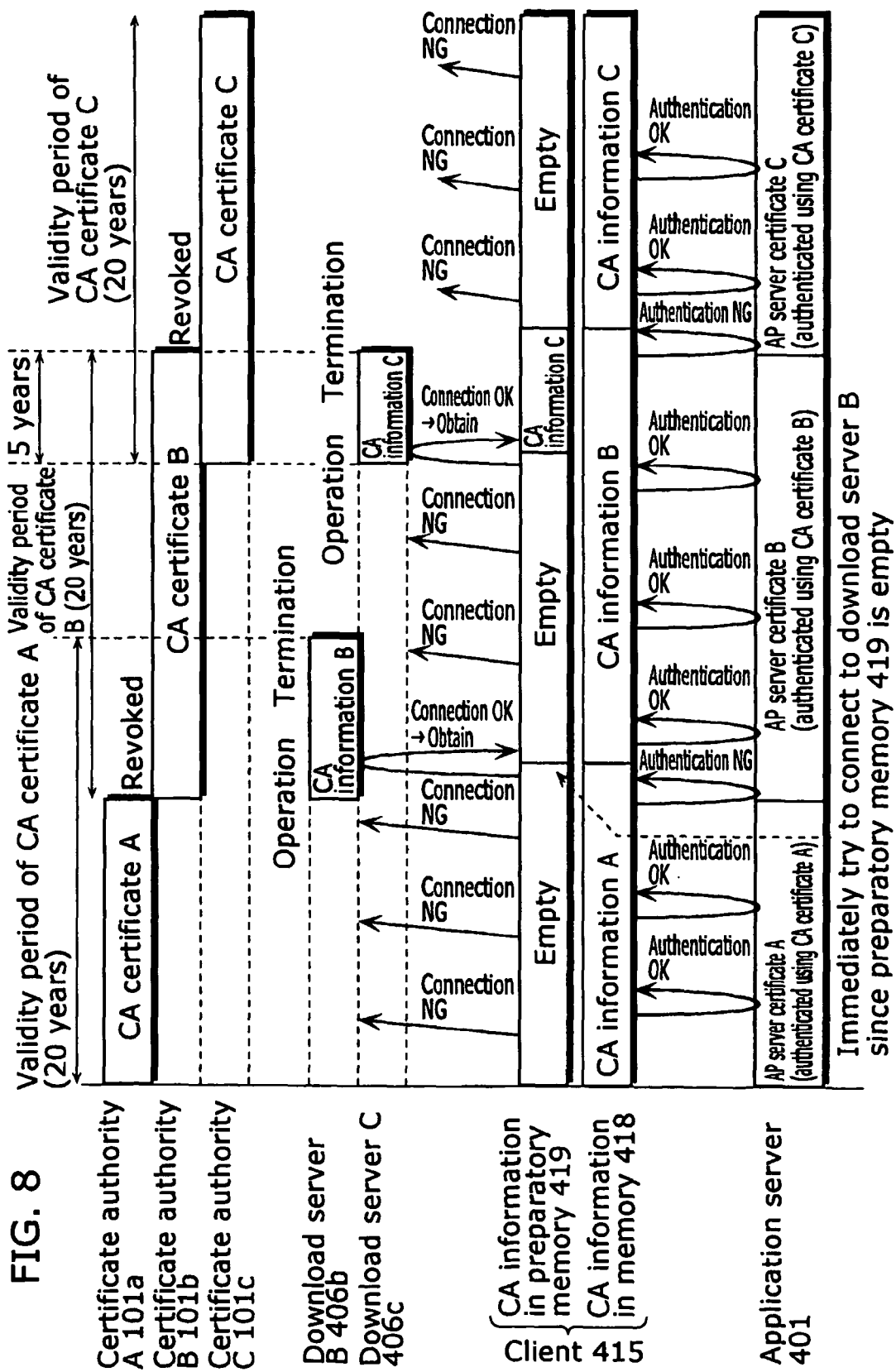
FIG. 8 is a diagram showing an example operational flow of the certificate authorities, client, download servers, and application server (in the case where a CA certificate A gets revoked before the download server B starts operating)

FIG. 8 is a diagram showing an example operational flow of the certificate authorities, client, download servers, and application server in the case where the CA certificate A gets revoked before the end of the validity period and where the next download server is not in operation yet when such CA certificate A gets revoked.

Figure 9:
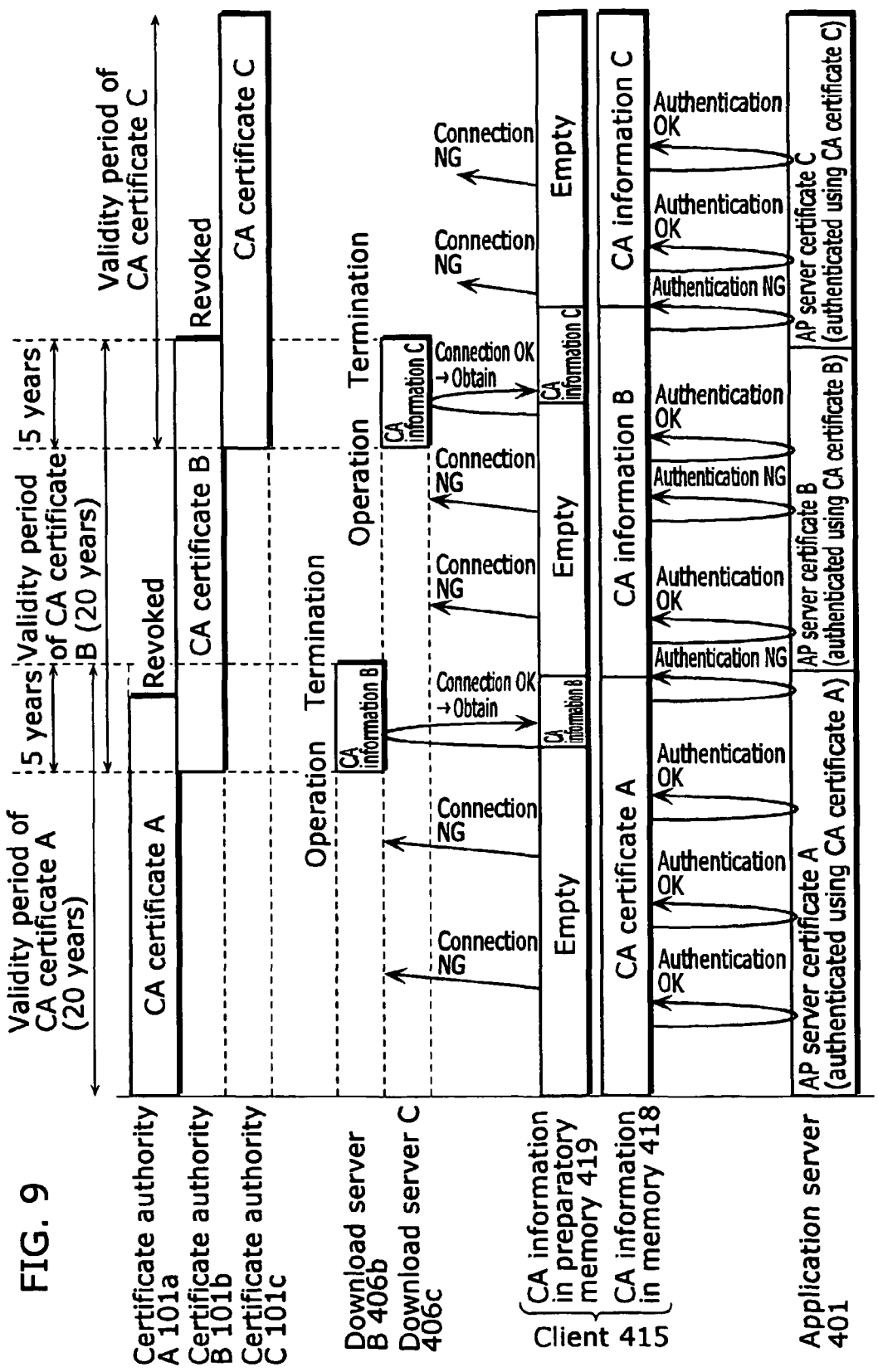
FIG. 9 is a diagram showing an example operational flow of the certificate authorities, client, download servers, and application server (in the case where the CA certificate A gets revoked while the download server B is in operation)

FIG. 9 is a diagram showing an example operational flow of the certificate authorities, client, download servers, and application server in the case where the CA certificate A gets revoked before the end of the validity period and where the next download server is already in operation when such CA certificate A gets revoked.

In the present embodiment, the validity period of the CA certificate A 106a shall be 20 years, and a new certificate authority B 101b and a new download server B 406b shall start operating five years before the validity period of the CA certificate A 106a expires.

Furthermore, a download server shall stop operating at the time when the validity period of the previous CA certificate expires. For example, the download server B 406b will stop operating upon expiration of the validity period specified in the CA certificate A 106a, i.e., 20 years after the certificate authority A 101a starts operating.

First, referring to the flowcharts shown in FIGS. 5 and 6, the example operations of the certificate authorities and download server are described. These drawings illustrate the steps carried out by the system operator that manages the certificate authorities and the download server.

As FIG. 5 shows, when the operation starts (Step 501), the system operator first brings the certificate authority A 101a into operation (Step 502).

The system operator checks if the CA certificate A 106a gets revoked before its validity period ends (Step 503), and goes on to Step 504 if the CA certificate A 106a is not revoked.

When the CA certificate A 106a is not revoked (No in Step 503), the system operator checks if it is five years before the validity period of the CA certificate A 106a expires (Step 504), and returns to Step 503 if it is not yet five years before the end of the validity period, whereas it goes on to Step 505 if it is five years before the end of the validity period.

When it is five years before the end of the validity period (Yes in Step 504), the system operator brings the certificate authority B 101b into provisional operation (Step 505), and also brings the download server B 406b into operation (Step 506). Note that, at this point of time, the certificate authority B 101b holds a key pair consisting of the CA public key B and the CA private key B 105b which it has generated, but a server certificate to be sent from the application server 401 to the client 415 is still the AP server certificate A 402a.

Subsequently, the system operator checks if the CA certificate A 106a gets revoked before the end of the validity period (Step 507), and goes on to Step 509 if the CA certificate A 106a is revoked, whereas it goes on to Step 508 if the CA certificate A 106a is not revoked.

When the CA certificate A 106a is not revoked (No in Step 507), the system operator checks if the validity period of the CA certificate A 106a is expired or not (Step 508), and returns to Step 507 if the validity period is not expired, whereas it goes on to Step 509 if the validity period is expired.

When the validity period is expired (Yes in Step 508), the system operator terminates the operation of the certificate authority A 101a, and brings the certificate authority B 101b into full operation (Step 510). Note that at this point of time, a server certificate sent from the application server 401 to the client 415 is an AP server certificate B on which a signature is created with the CA private key B 105b.

Meanwhile, if the CA certificate A 106a gets revoked before the end of its validity period (Yes in Step 503), the system operator terminates the operation of the certificate authority A 101a (Step 509), after bringing the download server B 406b into operation (Step 511).

Note that after starting the full operation of the certificate authority B 101b (Step 510), the system operator repeatedly execute the above steps by performing the processing which has been performed on the certificate authority A and CA certificate A, respectively on the certificate authority B and CA certificate B, and by performing the processing which has been performed on the certificate authority B, CA certificate B, and download server B, respectively on the next valid certificate authority C, CA certificate C, and download server C (Steps 503~510).

Meanwhile, the flowchart in FIG. 6 illustrates the processing for determining whether to terminate the operation of the currently operating download server.

When the download server starts operating (Step 601), the system operator checks the permitted operation period of such download server (Step 602). If such permitted operation period is not expired, the system operator returns to Step 602 to wait for such permitted operation period to expire, whereas if the permitted operation period is already expired, the system operator goes on to Step 603. Note that an example permitted operation period of the download server starts five years before the end of the validity period of the currently valid CA certificate and ends on the date of expiration of such validity period.

When the permitted operation period is expired (Yes in Step 602), the system operator terminates the operation of the download server (Step 603). For example, the system operator terminates the operation of the download server after the expiration of the validity period of the CA certificate which was valid until just a minute ago.

From then onward, the system operator repeats the above steps, so as to start and terminate the operation of a certificate authority and a download server.

As described above, according to the present embodiment, it is possible for the client 415 to renew the current CA certificate simply by holding the next valid CA certificate not only when the CA certificate gets revoked after the end of the validity period, but also when the CA certificate gets revoked before the end of its validity period, as in the case of the first embodiment. Accordingly, there is no need for the client 415 to hold many CA certificates all the time or to be equipped with a program or a circuit for authenticating a server by use of plural CA certificates. What is more, since it is possible for the client 415 to start communicating with another application server after obtaining a new CA certificate by periodically accessing the next valid download server, there is no need for such client 415 to check the validity period of the current CA certificate by use of a clock. Thus, even when the client 415 is a home appliance and the like which is not equipped with a sufficient amount of recourses, it becomes possible for the client 415 to obtain and renew a CA certificate in a reliable manner, without needing to care about when the validity period of a CA certificate expires.

Note that in FIG. 5, the order of Steps 505 and 506 may be reverse, or these steps may be carried out concurrently. Similarly, the order of Steps 509 and 510 may be reverse, or these steps may be carried out concurrently.

Next, a description is given of the operational flow of the client, download servers, and application server in the case where the certificate authorities and download server are operated according to the flowcharts shown in FIGS. 5 and 6. Here, a description is given respectively of the normal case (a CA certificate gets revoked due to the expiration of the validity period) and of the case where a CA certificate gets revoked before the end of the validity period due to some reason. Moreover, the operational flow for the case where a CA certificate gets revoked before the end of the validity period due to some reason, is further described for two cases: the next download server is already in operation at the point of time when a CA certificate gets revoked; and the next download server is not in operation yet at the point of time when a CA certificate gets revoked.

FIG. 7 is an operational flow of the client, download servers, and application server at the normal case.

In the client 415 in the default state, the CA information A 301*a* is stored in the memory 418, whereas nothing is stored in the preparatory memory 419.

Since it is possible to verify the AP server certificate A sent from the application server 401 by use of the CA public key A when it is within the validity period of the CA certificate A 106*a*, the client 415 can verify the validity of the application server 401 by use of the CA information A 301*a* which it holds.

Moreover, the client 415 periodically tries to get connected to the download server B 406*b* specified by the URL B 302*b*, but such connection inevitably fails, since it is after five years before the end of the validity period of the CA certificate A 106*a* that the download server B 406*b* starts operating.

At the point of time when the remaining validity period of the CA certificate A 106*a* becomes five years, the system operator sets up a new certificate authority B 101*b* and generates a new CA certificate B 106*b* and CA information B 301*b*. At the same time, the system operator brings into operation the download server B 406*b* from which the CA information B 301*b* is downloadable.

When the download server B 406*b* is brought into operation, it becomes possible for the client 415 to get connected to such downloads server B 406*b*, and therefore to obtain the CA information B 301*b*. After verifying the validity of the CA information B 301*b*, the client 415 stores such CA information B 301*b* into the preparatory memory 419.

In order to connect to the download server B 406*b* periodically, the client 415 is connected to the download server B 406*b* so as to obtain CA information B 301*b* even after it obtained the CA information B 301*b*, as long as it is before the end of the validity period of the CA certificate A 106*a*. In this case, the obtained CA information B 301*b* may not have to be stored into the preparatory memory 419 if the CA information stored in the preparatory memory 419 and such obtained CA information B 301*b* are the same, or the obtained CA information B 301*b* may be always written over the CA information stored in the preparatory memory 419 if such obtained CA information B 301*b* is valid.

Meanwhile, when the validity period of the CA certificate A 106*a* expires, the application server 401 starts using, as a server certificate, the AP server certificate B which is to be verified by use of a new CA certificate B 106*b*. After this, the AP server certificate B serves as a server certificate to be obtained by the client 415 to start an SSL communication with the application server 401, but the client 415 cannot verify such AP server certificate B by use of the current CA certificate A 106*a*.

In response to this failure, the client 415 performs verification on the AP server certificate B using the CA certificate B 106*b* included in the CA information B 301*b* stored in the preparatory memory 419. After verifying the validity of the AP server certificate B, the client 415 resumes the SSL communication, and at the same time, moves the CA information B 301*b* stored in the preparatory memory 419 into the memory 418, so as to delete the information stored in the preparatory memory 419.

From then on, the client 415 performs server authentication by use of the CA certificate B 106*b*, and starts trying to connect to the download server C specified by the URL C 302*c* that is included in the CA information B 301*b*.

In this case, the operation of the download server B 406*b* is terminated upon expiration of the CA certificate A 106*a*.

By continuing the similar operation as above, the client 415 can authenticate the application server 401 and renew a CA certificate, even when a certificate authority is replaced with a new certificate authority and a CA certificate is renewed.

Meanwhile, in the case where it becomes impossible to assure the security of the CA private key A 105*a* such as when the CA private key A 105*a* has been decrypted, it is necessary to immediately revoke the CA certificate A 106*a* and to bring a new certificate authority B 101*b* into operation at the same time, so as to issue a new CA certificate B 106*b*. Also, the application server 401 is required to ask the new certificate authority B 101*b* to issue a new AP server certificate B, so as to use it for server authentication.

FIG. 8 is a diagram showing the operational flow of the certificate authorities, client, download servers, and application server in the case where the current CA certificate gets revoked before the download server from which the next CA information should be downloaded starts operating.

Each of the processes to be performed before the revocation of the CA certificate A 106a is the same as those shown in FIG. 7. Since the certificate authority B 101b is not yet in operation at the point of time when the CA certificate A 106a gets revoked, the system operator immediately brings the new certificate authority B 101b into operation and generates, at the same time, a new CA certificate B 106b and CA information B 301b. At the same time, the system operator brings the download server B 406b into operation so as to make the CA information B 301b downloadable.

In the case where the client 415 happens to succeed in connecting to the download server B 406b before performing authentication on the application server 401, after the CA certificate A 106a gets revoked, and succeeds in obtaining new CA information B 301b, the client 415 is allowed to update the current CA information as in the case of the normal case.

When the client 415 performs authentication on the application server 401 before obtaining the CA information B 301b, it fails to verify the AP server certificate B. In spite of this, however, the new CA information B 301b is not stored in the preparatory memory 419 at that point of time. In such a case, the client 415 immediately tries to get connected to the download server B 406b. Since the download server B 406b is already in operation at that point of time, it is possible for the client 415 to obtain new CA information B 301b from such download server B 406b.

After the new CA information B 301b is obtained, the same processes as those performed in the normal case are repeated. Note that, as shown in FIG. 8, however, the download server B 406b continues to be in operation until the date which was supposed to be the end date of the validity period of the CA certificate A 106a, even when such CA certificate A 106a gets revoked before the end of the validity period.

FIG. 9 is a diagram showing the operational flow of the certificate authorities, client, download servers, and application server in the case where the current CA certificate gets revoked after the download server from which the next CA information should be downloaded is brought into operation.

Each of the processes to be performed before the revocation of the CA certificate A 106a is the same as those shown in FIG. 7.

From the point of time when the CA certificate A 106a gets revoked, the application server 401 uses the new AP server certificate B issued by the new certificate authority B 101b for server authentication to be performed in a communication with the client 415.

Moreover, since the certificate authority B 101b and the download server B 406b are already in operation at the point of time when the CA certificate A 106a gets revoked, the client can obtain the CA information B 301b. Thus, if the client 415 already stores in the preparatory memory 419 the CA information B 301b which it obtained, the client 415 will be able to update the current CA information at the point of time when it fails to verify the AP server certificate B, as in the case shown in FIG. 7.

Furthermore, when failing to verify the AP server certificate B before obtaining new CA information B 301b, the client 415 tries to get connected to the download server B 406b at that timing, so as to obtain the new CA information B 301b, and continues the processing for verifying the AP server certificate B, as in the case shown in FIG. 8.

From then on, the same processes as those to be performed in the normal case are repeated. Note that, as shown in FIG. 9, however, the download server B 406b continues to be in operation until the date which was supposed to be the end date of the validity period of the CA certificate A 106a, even when such CA certificate A 106a gets revoked before the end of the validity period.

By continuing the similar operation as above, the client 415 can authenticate the application server 401 and renew a CA certificate, even when a CA certificate gets revoked before the end of its validity date.

Note that it is described in the present embodiment that the validity period of a CA certificate is 20 years, and a new certificate authority and a new download server are brought into operation five years before the end of the validity period of the CA certificate. The present invention, however, is applicable to the case where the validity period of a CA certificate is other than 20 years and where it is not five years before the end of the validity period of the CA certificate that a new certificate authority and a new download server are brought into operation. Therefore, the validity period of all CA certificates may not have to be 20 years and may vary depending on CA certificate.

Furthermore, in the present embodiment, the preparatory memory 419 is emptied by moving the CA information B 301b stored in the preparatory memory 419 into the memory 418. Instead of this, the roles of the memory 418 and the preparatory memory 419 may be switched after the memory 418 is emptied, and from then on, the roles of the memory 418 and the preparatory memory 419 may be switched every time CA information is updated.

Figure 10:
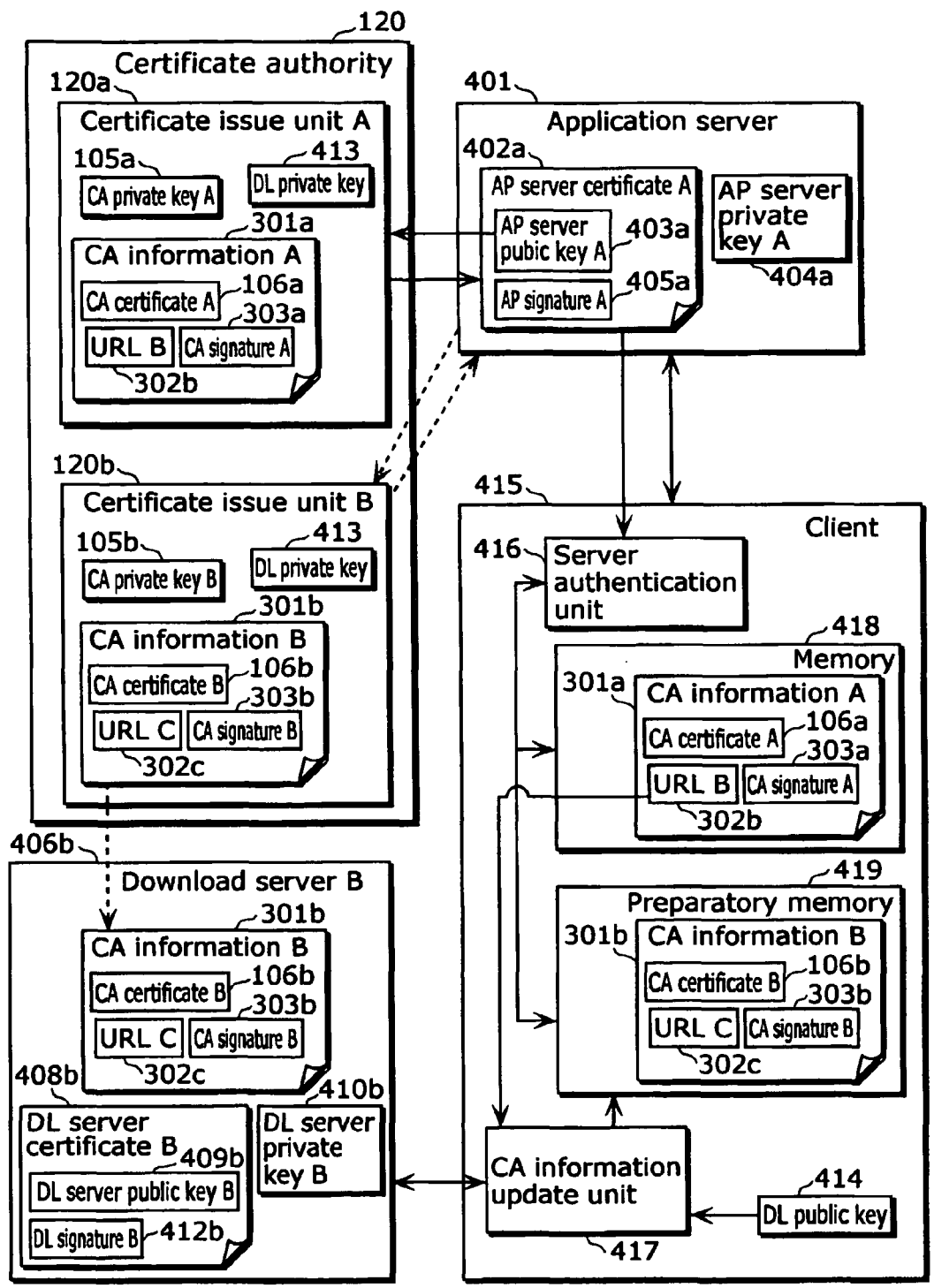
FIG. 10 is a diagram showing a configuration of a communication system in which a single certificate authority issues plural server certificates and CA information.

Moreover, in the present embodiment, there are plural certificates authorities, i.e., the certificate authority A 101a and the certificate authority B 101b, but it is also possible that a single certificate authority issues plural server certificates and CA information, as in the case of the system configuration shown in FIG. 10. In FIG. 10, one certificate authority 120 is equipped with two certificate issue units A 120a and B 120b. The certificate issue unit A 120a corresponds to the certificate authority A 101a shown in FIG. 3, whereas the certificate issue unit B 120b corresponds to the certificate authority B 101b shown in FIG. 3. The same is applicable to the download server. More specifically, the certificate authorities and download server in the present embodiment may not be physical units, and therefore they may exist as functional units which are independent of whether they are implemented in the same computer apparatus or in different computer apparatuses, and the like.

Also, in the present embodiment, the system operator sets up and terminates the certificate authorities and download server, but the present invention is not limited to such a case where a series of processing is performed by human hands. Therefore, the certificate authorities and download server may be automatically set up or terminated by an administrative computer that operates according to a predetermined operation schedule.

The present invention is capable of being used as a client apparatus (communication apparatus) and the like that receives a service from a server after checking the validity of such server, and particularly as a home appliance and the like, such as an audio-video equipment, with a small amount of resources including memory.

The invention claimed is:

1. A method operating a communication system comprising (i) an $N^{th}$ authentication apparatus, (ii) an $(N+1)^{th}$ authentication apparatus, and (iii) an $(N+1)^{th}$ download server, each being connected over a communication network, wherein N and (N+1) are values each indicating a number in a sequence in a case where a plurality of authentication apparatuses and a plurality of corresponding download servers are sequentially put into operation, N being an integer of 1 or larger, wherein the $N^{th}$ authentication apparatus includes:

an $N^{th}$ server certificate issue unit operable to issue an $N^{th}$ server certificate ensuring validity of an application server; and an Nth certificate authority (CA) information issue unit operable to issue $N^{th}$ CA information including an $N^{th}$ CA certificate and an $(N+1)^{th}$ address for update, the $N^{th}$ CA certificate indicating that the Nth server certificate is valid, and the $(N+1)^{th}$ address for update indicating a location of the $(N+1)^{th}$ download server on the communication network, wherein the $(N+1)^{th}$ authentication apparatus includes:

an $(N+1)^{th}$ server certificate issue unit operable to issue an $(N+1)^{th}$ server certificate ensuring the validity of the application server; and an $(N+1)^{th}$ CA information issue unit operable to issue $(N+1)^{th}$ CA information including an $(N+1)^{th}$ CA certificate and an $(N+2)^{th}$ address for update, the $(N+1)^{th}$ CA certificate indicating that the $(N+1)^{th}$ server certificate is valid, the $(N+2)^{th}$ address for update indicating a location, on the communication network, of an $(N+2)^{th}$ download server on which $(N+2)^{th}$ CA information is placed, and the $(N+2)^{th}$ CA information including an $(N+2)^{th}$ CA certificate to be a next valid CA certificate in a case where the $(N+1)^{th}$ CA certificate is revoked, wherein the $(N+1)^{th}$ download server includes:

a CA information storage unit operable to store the $(N+1)^{th}$ CA information including the $(N+1)^{th}$ CA certificate to be a next valid CA certificate in a case where the $N^{th}$ CA certificate is revoked; and an output unit operable to output, to a communication apparatus, the $(N+1)^{th}$ CA information stored in the CA information storage unit, the communication apparatus being connected to the $(N+1)^{th}$ download server via the communication network, the communication apparatus being a client apparatus that receives a service from the application server after the validity of the application server is verified, and wherein said method comprises:

an Nth operation step of starting up the Nth authentication apparatus to place the Nth authentication apparatus in operation to issue the Nth server certificate;

issuing, via the $N^{th}$ CA information issue unit of the $N^{th}$ authentication apparatus, the $N^{th}$ CA information including (i) the $N^{th}$ CA certificate indicating that the $N^{th}$ server certificate is valid and (ii) the $(N+1)^{th}$ address for update indicating the location of the $(N+1)^{th}$ download server on the communication network;

a first revocation determination step of determining whether or not the $N^{th}$ CA certificate has been revoked before a validity period of the $N^{th}$ CA certificate expires;

a before-validity-period-expiration determination step of determining whether or not a certain point in time before the validity period of the $N^{th}$ CA certificate expires has arrived, when said first revocation determination step determines that the $N^{th}$ CA certificate has not been revoked;

an $(N+1)^{th}$ operation step of starting up the $(N+1)^{th}$ authentication apparatus and the $(N+1)^{th}$ download server to place the $(N+1)^{th}$ authentication apparatus and the $(N+1)^{th}$ download server into operation, when said before-validity-period-expiration determination step determines that the certain point in time before the validity period of the $N^{th}$ CA certificate expires has arrived;

a second revocation determination step of redetermining whether or not the $N^{th}$ CA certificate has been revoked before the validity period of the $N^{th}$ CA certificate expires;

a validity-period-expiration determination step of determining whether or not the validity period of the $N^{th}$ CA certificate has expired, when said second revocation determination step determines that the $N^{th}$ CA certificate has not been revoked; and a termination step of terminating the operation of the $N^{th}$ authentication apparatus when said validity-period-expiration determination step determines that the validity period of the $N^{th}$ CA certificate has expired.

2. The method according to claim 1, wherein, said (N+1)th operation step further includes, when the Nth CA certificate is revoked before the validity period of the Nth CA certificate expires, starting up the (N+1)th authentication apparatus and the (N+1)th download server to be put into operation.

* * * * *